United States Patent [19]

Burland

[11] 3,779,436
[45] *Dec. 18, 1973

[54] SUPPORTING BAR ASSEMBLY FOR VEHICLE
[76] Inventor: Oliver J. Burland, 214 Rugley Rd., Western Springs, Ill.
[ * ] Notice: The portion of the term of this patent subsequent to July 18, 1989, has been disclaimed.
[22] Filed: Feb. 17, 1972
[21] Appl. No.: 227,196

Related U.S. Application Data
[63] Continuation-in-part of Ser. No. 886,829, Dec. 22, 1969, Pat. No. 3,677,451.

[52] U.S. Cl. .......................................... 224/42.1 G
[51] Int. Cl. ........................................... B60m 11/00
[58] Field of Search .................. 224/42.1 G, 42.1 F, 224/42.1 D, 42.1 R, 42.1 E; 151/41.76, 41.71

[56] References Cited
UNITED STATES PATENTS
| | | | |
|---|---|---|---|
| 3,677,451 | 7/1972 | Burland | 224/42.1 F |
| 3,281,030 | 10/1966 | Gosswiller | 224/42.1 F |
| 1,633,295 | 6/1927 | Sutherland et al. | 85/32 |
| 2,480,353 | 8/1949 | Bjork | 224/42.1 F |
| 2,643,040 | 6/1953 | Hare | 224/42.1 F |
| 3,339,953 | 9/1967 | Bohn | 151/41.76 |
| 2,603,394 | 7/1952 | Beck | 224/42.1 G |

Primary Examiner—Gerald M. Forlenza
Assistant Examiner—Jerold M. Forsberg
Attorney—Dawson, Tilton, Fallon & Lungmus

[57] ABSTRACT

A supporting bar structure for a vehicle includes an elongated bar and a pair of end support means for supporting the bar above the roof of the vehicle. The bar includes substantially planar top and bottom surfaces, and at least one longitudinally extending T-shaped slot is provided in each of the surfaces. Attachment means are slidably received in each of the slots, and each attachment means includes shoulders which extend laterally outwardly beyond the edges of the slot to prevent removal of the attachment means therefrom. The bar is shorter than the width of the vehicle, and one of the support means includes clamping means for securing one end of the bar to the side of the vehicle roof which the other support means includes a suction cup for securing the other end of the bar to the vehicle roof. Each of the support means includes attachment means which are threadedly engageable with the attachment means in the bottom wall slot to tighten the shoulders of the attachment means in the slot against the bottom wall of the bar, and the attachment means in the top wall slot can be used to secure warning lights, sirens, and the like to the support bar.

9 Claims, 5 Drawing Figures

PATENTED DEC 18 1973 3,779,436
SHEET 1 OF 2
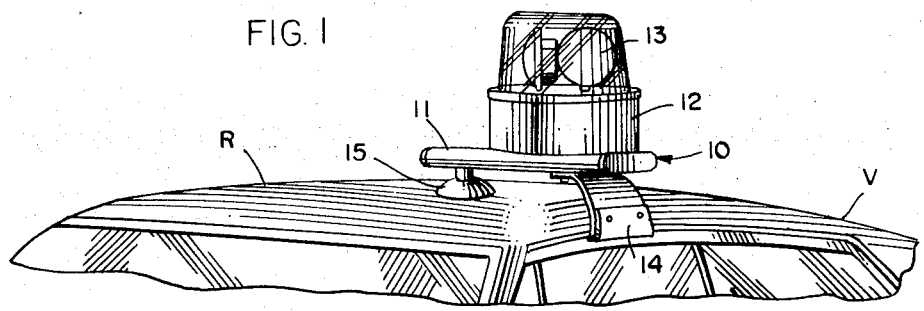
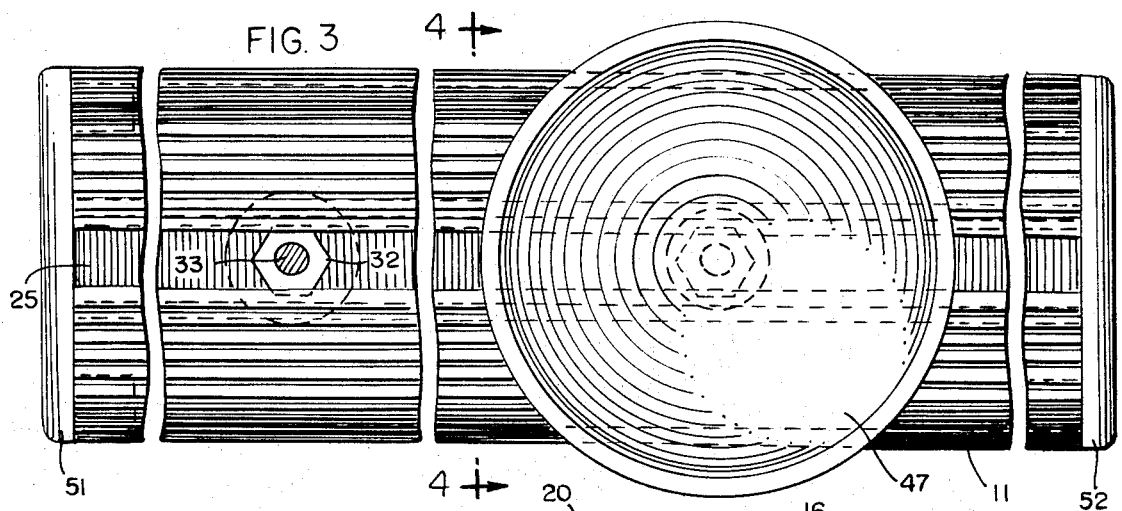
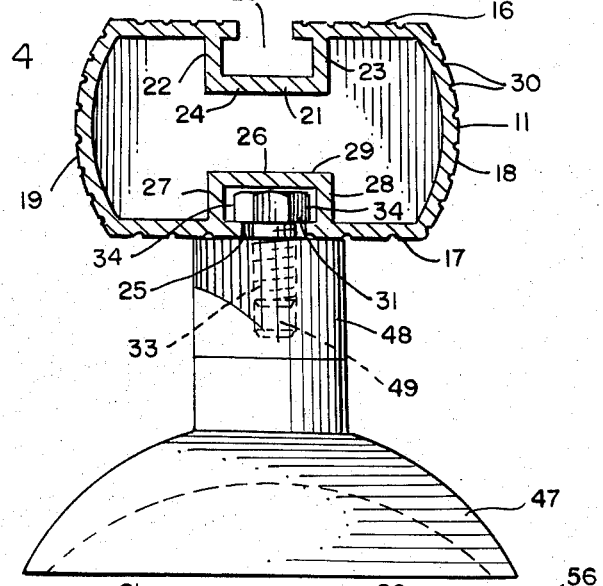
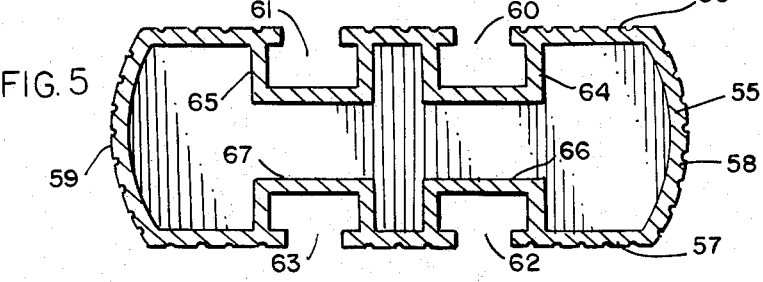

SUPPORTING BAR ASSEMBLY FOR VEHICLE

RELATED APPLICATION

This application is a continuation-in-part of my prior application entitled "Supporting Bar Assembly For Vehicle," Ser. No. 886,829, filed Dec. 22, 1969 now U.S. Pat. No. 3,677,451.

BACKGROUND

This invention relates to a supporting bar structure for a vehicle, and, more particularly, to a supporting bar structure particularly suitable for mounting vehicle warning devices such as signal lights and sirens to emergency vehicles.

In the past, vehicle warning devices have generally been mounted on vehicles by securing the device directly to the roof of the vehicle. However, it is desirable to provide mounting means for these signal devices for detachably securing the device to the vehicle. For example, an emergency vehicle such as a police car on which the signal device is detachably mounted can readily be converted to an unmarked patrol car. Further, if the vehicle becomes damaged or its useful life has ended, it is desirable to remove the signal device so that it may continue to be used and to prevent the signal device from being improperly used by a future owner of the vehicle.

It is also desirable to provide mounting means which can be quickly and securely attached to the vehicle in an emergency and quickly and easily removed from the vehicle when the emergency has passed. For example, volunteer firemen generally must drive their own vehicles to the fire station or to the scene of the fire. Since it may be inconvenient and possibly even illegal to mount a warning device on a family car except during emergency situations, it is desirable to provide mounting means which can be used to support a warning device only when needed. It will be appreciated, however, that such mounting means should be capable of fast installation.

Summary

The invention provides a supporting bar structure which permits signal devices to be readily mounted on a variety of vehicles. The supporting bar is adapted for use with a number of signal devices such as a warning light, siren, or the like, and the support bar may be quickly and firmly secured to the vehicle without damaging or marring the vehicle. Although the supporting bar can be installed quickly, the bar and the signal device carried thereby are firmly anchored against movement. When it is desired to remove the signal device, the supporting bar can be quickly detached from the vehicle.

DESCRIPTION OF THE DRAWING

The invention will be explained in conjunction with illustrative embodiments shown in the accompanying drawing, in which:

FIG. 1 is a perspective view of the support bar assembly attached to the roof of a vehicle;

FIG. 3 is a view, partially broken away, taken along the line 3—3 of FIG. 2;

FIG. 4 is a view taken along the line 4—4 of FIG. 2; and

FIG. 5 is a transverse sectional view of a modified support bar.

DESCRIPTION OF SPECIFIC EMBODIMENTS

Figure 2:
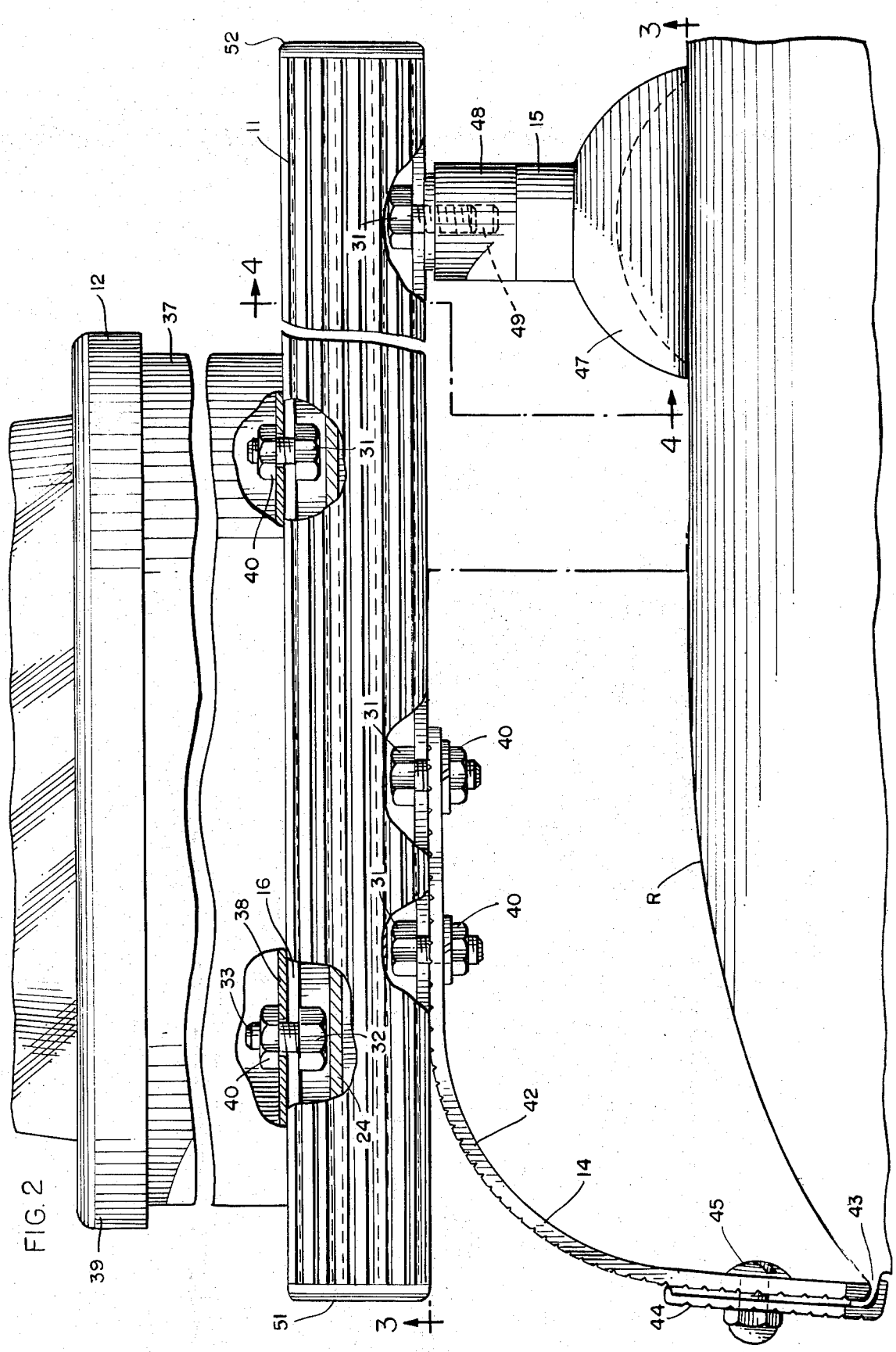
FIG. 2 is a fragmentary front elevational view of the support bar assembly.

Referring to FIG. 1, the numeral 10 designates generally a supporting bar assembly for supporting emergency signal devices and the like above a vehicle V having a roof R. The support bar assembly includes an elongated bar 11 which carries, in the illustration given, a warning light housing 12. The light housing encloses conventional emergency warning lights 13 which may reciprocate or rotate within the housing. A pair of support means 14 and 15 adjacent the ends of the support bar detachably secure the bar to the vehicle.

Referring now to FIG. 4, the support bar 11 is seen to be symmetrical about a vertical plane through the longitudinal center line and includes generally planar, parallel top and bottom walls 16 and 17 and a pair of curved side walls 18 and 19. A longitudinally extending slot 20 is provided through the top wall throughout the length thereof, and a channel-shaped wall 21 extends downwardly from the inner surface of the top wall below the slot. The channel-shaped wall 21 includes spaced-apart parallel side wall portions 22 and 23 which are spaced laterally or transversely outwardly of the edges of the slot 20 and a web portion 24 which extends generally perpendicularly between the side wall portions. The bottom wall 17 is provided with a similar longitudinally extending slot 25, and a channel-shaped wall 26 extends upwardly from the inner surface of the bottom wall and includes parallel side wall portions 27 and 28 and web 29. The outer surfaces of the top, bottom and side walls of the bar are provided with longitudinally extending generally V-shaped serrations or grooves 30.

The channel-shaped walls 21 and 26 provide the slots with a generally T-shaped cross section so that each slot may slidably receive bolts 31. Each bolt includes a head 32 (FIGS. 2 and 3) which is wider than the width of the slots and a threaded shank 33 which extends between the edges of the slot. Each bolt head includes opposed flat side surfaces 34 and 34 (FIG. 4) which are engageable with the side wall portions of the associated channel-shaped wall to prevent rotation of the bolt head within the slot. The particular bolts illustrated are conventional hexagonal head bolts, but other shapes can also be used.

The light housing 12 is secured to the support bar by the bolts 31 in the slot 20 (FIG. 2). The particular light housing illustrated is conventional and includes a base portion 37 having a bottom wall 38 and a globe or dome portion 39 which may be removably secured to the base portion. The shanks 33 of the bolts in the top slot 20 extend through openings provided in the bottom wall 38 of the light housing, and nuts 40 are threaded onto the shanks before the globe portion is attached to the base portion. As each nut is started on a bolt, the web 24 of the channel 21 backs up the bolt and prevents the bolt from moving downwardly. As the nut is tightened on the bolt, the head of the bolt, which provides shoulders extending laterally outwardly beyond the edges of the slot, is drawn into engagement with the inner surface of the top wall and the light housing is drawn against the outer surface of the top wall to securely anchor the light housing on the support bar. In the particular embodiment illustrated the light housing is secured by a pair of bolts, but more or less bolts could be used depending upon the structure of the particular light housing or other warning device.

The support bar and light housing are secured to the vehicle by means of the support means 14 and 15. The support means 14 illustrated is identical to the support bracket described in my prior application Ser. No. 886,829, filed Dec. 22, 1969. As described in that application, the support bracket includes a generally trapezoidally shaped bracket plate 42 which is adapted to be supported by the rain trough 43 of the vehicle and a clamping plate 44 which is secured to the bracket plate by bolts 45 and which is tightened against the outside of the rain trough. The upper portion of the bracket plate 42 extends generally horizontally and is provided with spaced-apart openings through which longitudinally spaced bolts 31 in the bottom slot 25 extend. These bolts are similarly engaged by nuts 40 which draw the shoulders of the bolt heads against the inner surface of the bottom wall of the bar and the bracket plate against the outer surface of the bottom wall. The bolts are slidable within the bottom slot 25 to permit the bracket plate to be secured as desired along the length of the bar, and the web 29 of the channel-shaped wall 26 provides back-up means to facilitate threading the nuts onto the bolts.

The support bar is seen to be substantially shorter than the width of the vehicle roof, and the particular bar illustrated is only about 12 inches long. The right hand end of the bar in FIG. 2 therefore terminates above the vehicle roof, and the support means 15 for this end of the bar comprises a conventional suction cup 47 provided with a top metal fitting 48. The fitting 48 is drilled and tapped to provide a threaded bore 49 to permit the suction cup to be screwed onto another bolt 31 in the bottom slot 25. The position of the suction cup relative to the right end of the supporting bar can be easily varied merely by unscrewing the fitting 48 slightly to permit the fitting and the bolt to slide along the bottom wall. When the position of the suction cup has been adjusted as desired, the fitting can be tightened on the bolt to clamp the bottom wall between the bolt and the fitting.

The longitudinal adjustability of the support means 14 and 15 permits the support bar assembly to be secured to almost any type of vehicle roof while maintaining the support bar and the warning device carried thereby level. A vehicle roof conventionally curves upwardly from the rain trough along the side thereof as shown in FIG. 2, and, since the suction cup terminates above the bottom of the bracket plate, the support bar can be leveled horizontally after the bracket plate is positioned in the rain trough by adjusting the longitudinal spacing between the bracket plate and the suction cup. When this spacing is such that the bar is horizontal, the support means can be firmly secured against the support bar. In most instances, the bar can be leveled merely by moving the suction cup, and the clamping plate need not be loosened. When the suction cup has been adjusted as desired, it can be firmly secured to the vehicle roof by exerting a downward force thereon.

After the appropriate number of bolts are inserted in the top and bottom slots 20 and 25 at the ends of the bar, the ends of the bar may be closed by removable end caps 51 and 52 similar to the end caps described in my aforementioned application.

The support bar can be advantageously formed by extruding to provide the bar with the hollow, closed interior shown in FIG. 2, and the webs 24 and 29 of the channel-shaped walls are advantageously spaced apart to provide a longitudinally extending space or channel therebetween which can accommodate the wires of the warning device. The wires can therefore extend from the light housing into the interior of the bar at one point along the length thereof and extend outwardly from the bar at another point.

The extremely short length of the bar compared with conventional warning device support bars permits the supporting bar assembly to be removed from the roof and conveniently stored within the interior of the vehicle or within the vehicle trunk. The short length of the bar also enables the bar and the warning device to be quickly mounted by a single person from one side of the vehicle, and the vehicle can be prepared for am emergency situation extremely quickly.

A modified support bar 55 is shown in FIG. 5. This bar similarly includes generally planar parallel top and bottom walls 56 and 57 which are joined by curved side walls 58 and 59. However, the width of the top and bottom walls is somewhat greater than the width of the walls of the support bar 11, and a pair of longitudinally extending slots 60 and 61 and a pair of longitudinally extending slots 62 and 63 are provided through, respectively, the top and bottom walls. Channel-shaped walls 64 and 65 extend downwardly from the top wall below the slots 60 and 61, and channel-shaped walls 66 and 67 extend upwardly from the bottom wall above the slots 62 and 63. The modified bar 55 may be used when it is desired to provide attachment to the warning device or to the support means at fore-and-aft spaced locations.

Although I have shown bolts as the attachment means which are received in the slots of the bar, other forms of attachment means could also be used. For example, the T-shaped fittings described in my aforementioned application could be used to engage bolts extending through the warning device or the mounting means, or conventional nuts can be positioned within the slots. I have found, however, that bolts or the T-shaped fittings can be readily manipulated from outside of the bar and permit the attachment means to be more easily positioned along the length of the bar.

While in the foregoing specification detailed descriptions of specific embodiments of my invention have been set forth for the purpose of illustration, it is to be understood that many of the details hereingiven may be varied considerably by those skilled in the art without departing from the spirit and scope of the invention.

I claim:

1. A supporting bar assembly for a vehicle comprising an elongated bar having substantially planar top and bottom walls, each wall having an inner surface and an outer surface and having a slot extending longitudinally for the entire length of the bar, a first generally channel-shaped wall extending downwardly from the inner surface of the top wall and a second generally channel-shaped wall extending upwardly from the inner surface of the bottom wall, the first channel-shaped wall having spaced-apart side wall portions extending from the inner surface of the top wall transversely outwardly of each edge of the slot in the top wall to provide the slot with a generally T-shaped transverse cross section, the second channel-shaped wall having spaced-apart side wall portions extending from the inner surface of the bottom wall transversely outwardly of each edge of the slot in the bottom wall to provide the slot with a generally T-shaped transverse cross section, a pair of attachment means slidably received in the slot in the bottom wall and at least one attachment means slidably received in the slot in the top wall, each of the attachment means including a pair of shoulders extending transversely outwardly of the edges of the associated slot and engageable with the inner surface of the associated wall for preventing withdrawal of the attachment means from the slot, support means for each end of the bar, and attachment means for each support means, the attachment means on each support member being threadedly engaged with one of the attachment means in the slot in the bottom wall to draw the shoulders of the attachment means in the slot into engagement with the inner surface of the bottom wall and to draw the support means into engagement with the outer surface of the bottom wall, the attachment means in the top wall slot being adapted to threadedly engage attachment means on a device to be carried by the support bar whereby the shoulders of the attachment means in the top wall slot may be drawn into engagement with the inner surface of the top wall and the device may be drawn into engagement with the outer surface of the top wall.

2. The structure of claim 1 in which the attachment means in the slots are bolts, each bolt including a head having a transverse dimension greater than the width of the slots to provide said shoulders.

3. The structure of claim 2 in which the head of each bolt includes a pair of opposed generally flat side surfaces which are engageable with the side wall portions of one of the channel-shaped walls to prevent rotation of the bolts within the slots.

4. The structure of claim 1 in which one of the support means is a bracket equipped with clamping means for securing one end of the bar to the side of a vehicle and the other support means includes a suction cup for securing the other end of the bar to the roof of the vehicle.

5. The structure of claim 1 in which each of the channel-shaped walls includes a web portion extending between the side wall portions, the web portion of the top channel-shaped wall supporting the attachment means in the top wall slot when the attachment means is not engaged with the attachment means on the device to be carried by the support bar, the web portion of the bottom channel-shaped wall providing backup means for the attachment means in the bottom wall slot to prevent the attachment means from moving away from the bottom wall slot as the support means are secured.

6. The structure of claim 5 in which the side wall portions of each channel-shaped wall are generally parallel and the web portion extends generally perpendicularly to the side wall portions.

7. The structure of claim 5 in which the web portions of each channel-shaped wall are spaced apart to provide a longitudinally extending channel therebetween.

8. The structure of claim 1 in which one of the support means is a bracket equipped with clamping means for securing one end of the bar to the side of the vehicle and the other support means includes a suction cup for securing the other end of the bar to the roof of the vehicle, each of the attachment means in the bottom wall slot comprising a bolt including a head having a transverse dimension greater than the width of the bottom wall slot to provide said shoulders, the attachment means on the bracket including a nut threadedly engaged with one of the bolts in the bottom wall slot, and the attachment means for the suction cup including a fitting having a threaded opening threadedly engaged with the other bolt in the bottom wall slot.

9. The structure of claim 8 in which the suction cup terminates above the bottom of the bracket.

* * * * *